(12) United States Patent
Sakamoto

(10) Patent No.: US 6,711,289 B1
(45) Date of Patent: Mar. 23, 2004

(54) COLOR CONVERSION APPARATUS AND METHOD

(75) Inventor: Koichi Sakamoto, Asaka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/511,909

(22) Filed: Feb. 23, 2000

(30) Foreign Application Priority Data

Feb. 23, 1999 (JP) .......................................... 11-044307

(51) Int. Cl.[7] ............................. G06K 9/00; G03F 3/08; H04N 9/68
(52) U.S. Cl. ...................... 382/167; 358/520; 358/522; 348/645
(58) Field of Search ................................. 382/167, 166, 382/162; 358/518, 520, 522; 348/645; 345/590

(56) References Cited

U.S. PATENT DOCUMENTS

| | | | | |
|---|---|---|---|---|
| 5,539,540 A | * | 7/1996 | Spaulding et al. | 358/518 |
| 5,583,666 A | * | 12/1996 | Ellson et al. | 358/518 |
| 5,596,428 A | * | 1/1997 | Tytgat et al. | 358/518 |
| 5,937,089 A | * | 8/1999 | Kobayashi | 382/167 |
| 5,982,925 A | * | 11/1999 | Koizumi et al. | 382/166 |
| 5,982,926 A | * | 11/1999 | Kuo et al. | 382/167 |
| 5,987,165 A | * | 11/1999 | Matsuzaki et al. | 382/162 |
| 6,041,136 A | * | 3/2000 | Ohga | 382/162 |
| 6,057,931 A | * | 5/2000 | McConnell et al. | 358/1.9 |
| 6,078,686 A | * | 6/2000 | Kim | 382/167 |

FOREIGN PATENT DOCUMENTS

JP 08-274997 * 10/1996 ............ H04N/1/41

OTHER PUBLICATIONS

Bryan S. Morse, Color, http://iul.cs.byu.edu/450/F96/node27.html, Nov. 21, 1996, p 1–6.*
Dictionary.com/tone, http://dictionary.reference.com/search?q=tone, p 1–7.*

* cited by examiner

Primary Examiner—Bhavesh M. Mehta
Assistant Examiner—Christopher Sukhaphadhana
(74) Attorney, Agent, or Firm—Sughrue Mion, PLLC

(57) ABSTRACT

No compression is applied to saturation data up to a value thereof slightly lower than a boundary of saturation values capable of being reproduced by an output unit. Data representing saturation equal to or greater than a threshold value is subjected to non-linear compression so as to render the data reproducible by the output unit. Since only the necessary saturation is compressed, an image having a saturation close to the saturation represented by the original input saturation data can be reproduced in the output unit.

5 Claims, 9 Drawing Sheets

COLOR CONVERSION APPARATUS AND METHOD

BACKGROUND OF THE INVENTION

1. Field of the Invention

This invention relates to a color conversion apparatus and method for compressing and outputting entered saturation data in such manner that the data can be reproduced by an output unit that is to output the data.

2. Description of the Related Art

Color reproduction characteristics differ depending upon the device that handles the color data. A color that can be reproduced in one device cannot always be reproduced in another device. Colors can almost never be matched perfectly across different devices even if color matching processing is applied.

Processing is also executed so as to compress (convert the color of) color data reproducible in one device, apply the compressed color data to another device and reproduce the color data in the other device. However, the color reproduced in the other device will be quite different from that reproduced in the first device.

DISCLOSURE OF THE INVENTION

An object of the present invention is to arrange it so that a color which cannot be reproduced in an output unit will be reproduced so as to be as faithful as possible to the original color.

According to the present invention, the foregoing object is attained by providing a color conversion apparatus comprising: a saturation data input unit (saturation data input means) for inputting saturation data; a compression threshold-value decision unit (compression threshold-value decision means) for deciding a compression threshold value regarding saturation based upon the saturation data that has been input from the saturation data input unit and data representing maximum saturation capable of being reproduced by an output unit; and a compression unit (compression means) for compressing the input saturation data that is equal to or greater than the compression threshold value decided by the compression threshold-value decision unit so as to obtain saturation data representing a saturation reproducible by the output unit, and forgoing compression of the input saturation data that is less than the compression threshold value.

The present invention provides also a method suited the apparatus described above. Specifically, the method comprises the steps of: inputting saturation data; deciding a compression threshold value regarding saturation based upon the saturation data that has been input and data representing maximum saturation capable of being reproduced by an output unit; and compressing the input saturation data that is equal to or greater than the decided compression threshold value so as to obtain saturation data representing a saturation reproducible by the output unit, and forgoing compression of the input saturation data that is less than the compression threshold value.

In accordance with the present invention, the saturation data is input and the compression threshold value is decided based upon the input saturation data and the maximum saturation (boundary saturation) capable of being reproduced by an output unit. If the saturation data is equal to or greater than the compression threshold value, the output unit often will not be able to faithfully reproduce the saturation represented by the input saturation data. This saturation data is therefore compressed so as to be capable of reproduction. If the saturation data is less than the compression threshold value, the saturation represented by the input saturation data is reproducible and, hence, no compression processing is applied.

Since data representing a saturation reproducible by the output unit is not compressed, saturation represented by the original saturation data can be reproduced in the output unit. Data representing a saturation that cannot be reproduced by the output unit is compressed and is not subjected to unnecessary compression. As a result, an image having a saturation near that represented by the original data can be reproduced.

It is preferred that the input saturation data equal to or greater than the compression threshold value be compressed non-linearly so as to obtain saturation data representing a saturation than can be reproduced by the output unit.

Since the input saturation data equal to or greater than the compression threshold value is subjected to non-linear compression, compression processing of the saturation data can be realized while maintaining the original gradation characteristic.

The compression threshold value can be decided based upon saturation data which has a high frequency of occurrence in one frame of the input saturation data and which is in the vicinity of the above-mentioned reproducible saturation within the saturations reproducible by the output unit.

Since the compression threshold value is decided based upon saturation data having a high frequency of occurrence, saturation data having a high frequency of occurrence is not compressed. Data having a high frequency of occurrence represents a conspicuous portion in which the proportion of this data is high even in the original image. Since saturation data in an area in which the proportion of the data is high is not compressed, the saturation of a conspicuous portion does not change.

An arrangement may be adopted in which hue data corresponding to input saturation data is entered, the hue data that corresponds to saturation data not reproducible by the output unit is detected based upon the maximum saturation, and compression processing is applied to the entered saturation data that corresponds to the detected hue data.

Thus, only saturation data not reproducible by the output unit is extracted and compressed. Since no compression is applied to reproducible saturation data, the original saturation can be maintained.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
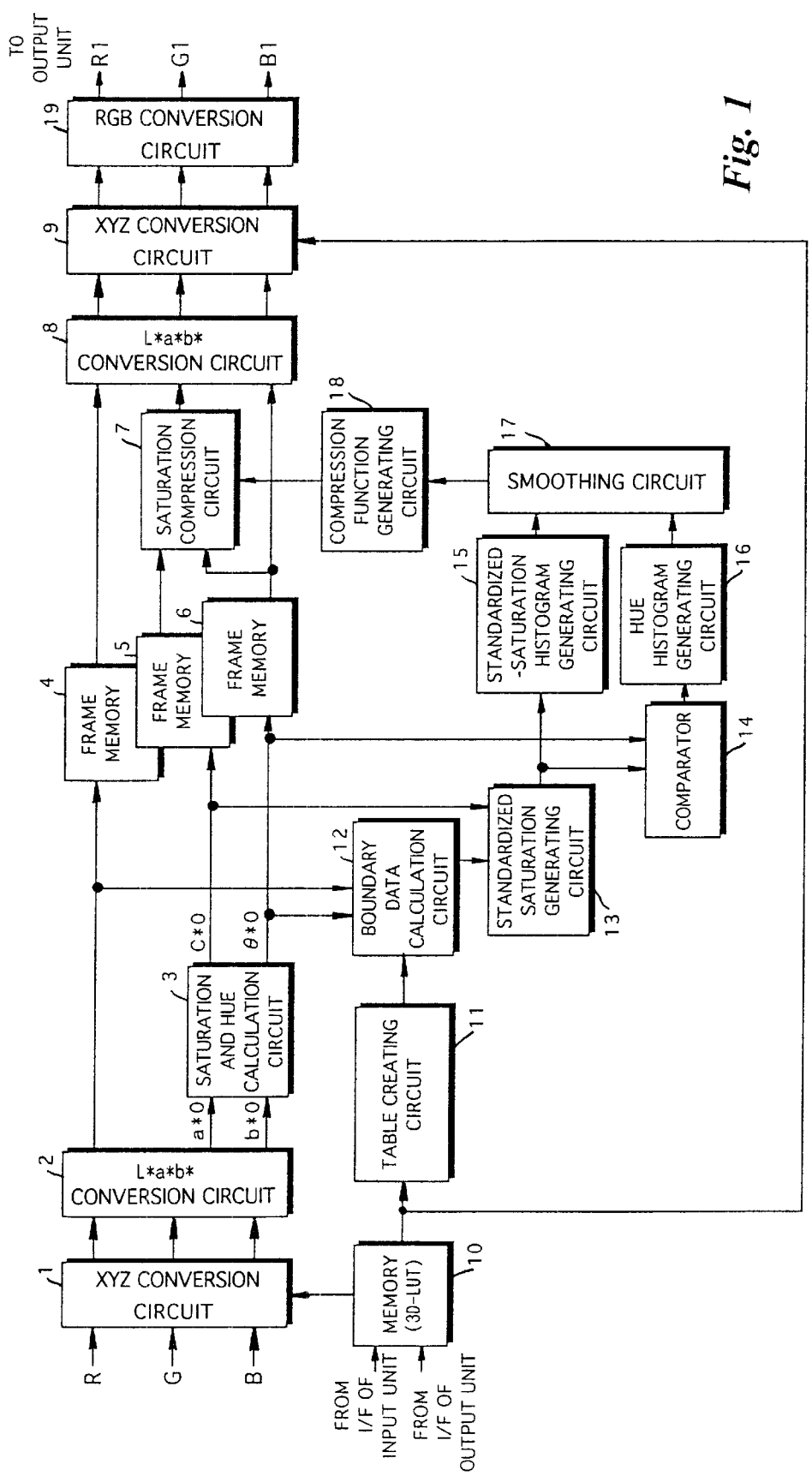
FIG. 1 is a block diagram illustrating the electrical construction of a color converting apparatus according to the present invention.

FIG. 1 is a block diagram illustrating the electrical construction of a color converting apparatus according to a preferred embodiment of the present invention.

The color conversion apparatus according to this embodiment converts RGB image data, which is provided by an input unit, to reproducible RGB image data and outputs this data in a case where an output unit is incapable of reproducing the input image data.

The apparatus includes a memory 10 storing an RGB three-dimensional LUT (look-up table), which is for the input unit, for converting the RGB image data output from the input unit to image data in an XYZ calorimetric system, and an RGB three-dimensional LUT, which is for the output unit, for converting image data in an XYZ calorimetric system to image data in an RGB colorimetric system applied to the output unit. The RGB three-dimensional LUT for the output unit indicates also data representing the boundary of the color reproduction area of the output unit.

The data representing the three-dimensional LUT that has been stored in the memory 10 is input to a data table creating circuit 11, which creates a table of data representing the boundary of the color reproduction area, and to an XYZ conversion circuit 9, described later.

Figure 2B:
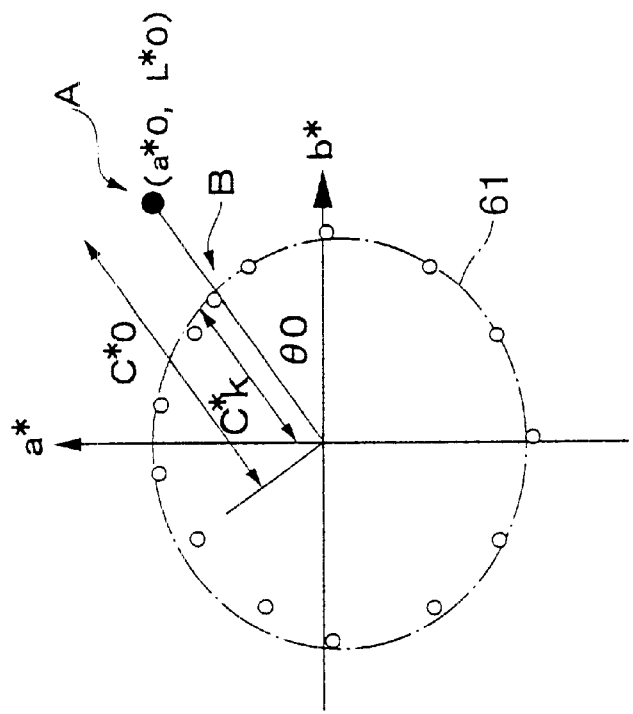
FIG. 2b illustrates the boundary of a color reproduction area of perceived chromaticities a* and b* having a prescribed lightness.
Figure 2A:
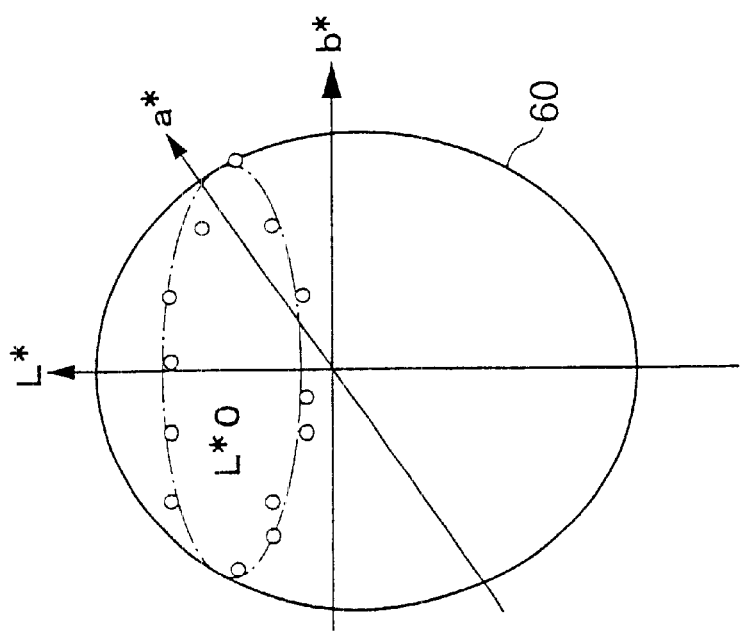
FIG. 2a illustrates the boundary of a color reproduction area in an L*a*b* calorimetric system.

FIG. 2a is a graphical representation of data representing the boundary of a color reproduction area.

The graph of FIG. 2a indicates data representing the boundary of color reproduction in an L*a*b* calorimetric system. Data within an ellipsoid 60 is data, in an L*a*b* calorimetric system, that is reproducible in the output unit. Data located on the surface of the ellipsoid 60 is boundary data, in a L*a*b* calorimetric system, reproducible in the output unit. Data located outside the surface of the ellipsoid 60 is data, in an L*a*b* colorimetric system, that is not reproducible in the output unit. Though the positions at which the boundary data exists in FIG. 2a are shown to be almost exactly on the ellipsoid for the sake of convenience, it goes without saying that these points do not actually define a perfect ellipsoid.

FIG. 2b is a graph indicating perceived chromaticities a* and b* having a certain prescribed lightness L* on the ellipsoid 60 shown in FIG. 2a.

Perceived chromaticities a* and b* located within an ellipse 61 are capable of being reproduced by the output unit at the lightness L*. Perceived chromaticities a* and b* located on the ellipse 61 are boundary perceived chromaticities capable of being reproduced by the output unit at the lightness L*. Perceived chromaticities a* and b* located outside the ellipse 61 are incapable of being reproduced by the output unit at the lightness L*.

With reference again to FIG. 1, data representing the lightness L* and perceived chromaticities a* and b* of the ellipsoid 60 indicative of the boundary of color reproduction is created in table form by the table creating circuit 11. It goes without saying that the table creating circuit 11 converts the color-reproduction boundary data of the output unit in the RGB image data obtained from the RGB three-dimensional LUT to color-reproduction boundary data in the L*a*b* calorimetric system.

Image data RGB of RGB provided by the input unit enters an XYZ conversion circuit 1. The XYZ conversion circuit 1 is provided by the memory 10 with the data of the input-unit RGB three-dimensional LUT for the purpose of making a conversion from the RGB image data to image data in the XYZ calorimetric system. The RGB image data provided by the input unit is converted to image data in the XYZ calorimetric system in the XYZ conversion circuit 1. The image data of the XYZ colorimetric system is input to an L*a*b* conversion circuit 2.

The input image data of the XYZ calorimetric system is converted to image data of the L*a*b* colorimetric system in the L*a*b* conversion circuit 2. Image data representing lightness L* in the image data of the L*a*b* calorimetric system is applied to a frame memory 4, which stores one frame of data. The image data representing lightness L* is input to a boundary-data calculation circuit 12 as well. The image data representing the perceived chromaticities a* and b* is applied to a saturation and hue calculation circuit 3. The latter calculates saturation C*0 and hue θ0 from the perceived chromaticities a* and b*. More specifically, saturation C*0 is calculated in accordance with Equation (1) and hue θ0 is calculated in accordance with Equation (2).

$$C^*0=\sqrt{a^*0^2+b^*0^2}$$ Equation (1)

$$\theta 0=\tan^{-1}(b^*0/a^*0)$$ Equation (2)

The data representing the one frame of saturation C*0 calculated in the saturation and hue calculation circuit 3 is input to a frame memory 5, where the data is stored temporarily. The data representing the one frame of hue θ0 is input to a frame memory 6, where the data is stored temporarily. The data representing the saturation C*0 and hue θ0 is input to the boundary-data calculation circuit 12 as well.

The boundary-data calculation circuit 12 calculates boundary perceived chromaticities a*k and b*k having the entered lightness L*.

In the data representing the ellipsoid 60 indicative of the boundary of the color reproduction area of the output unit, as shown in FIG. 2a, data representing the ellipse 61 indicative of the perceived chromaticities a* and b* having the lightness L* input from the L*a*b* conversion circuit 2 is found, as shown in FIG. 2b. If the saturation C*0 and hue θ0 input from the saturation and hue calculation circuit 3 are outside the ellipse 61, saturation C*k and hue θ0 located on the ellipse 61 serving as the boundary are found as the boundary data. For example, assume that the saturation C*0 and hue θ0 output by the saturation and hue calculation circuit 3 are indicated by point A, as shown in FIG. 2b. The saturation C*0 at point A is outside the ellipse 61 and the output unit cannot reproduce it. In this case perceived chromaticities a*k and b*k having a hue θ0 identical with the hue θ0 on the boundary of the ellipse 61 are calculated. The saturation C*k and hue θ0 located on the boundary of the ellipse 61 are obtained as the boundary data.

The boundary saturation C*k and hue θ0 calculated by the boundary-data calculation circuit 12 are input to a standardized-saturation generating circuit 13.

The standardized-saturation generating circuit 13 standardizes the saturation C*0, which has entered from the input unit, by the boundary saturation C*k in accordance with Equation (3). (The saturation C*0 is applied to the standardized-saturation generating circuit 13 from the saturation and hue calculation circuit 3.) As a result, standardized saturation P is obtained.

$$P = C^*0/C^*k \qquad \text{(Equation (3))}$$

The standardized saturation P is input to a standardized-saturation histogram generating circuit 15 and comparator 14.

The standardized-saturation histogram generating circuit 15 calculates the ratio of standardized saturation with regard to all pixels and obtains a histogram.

Figure 3:
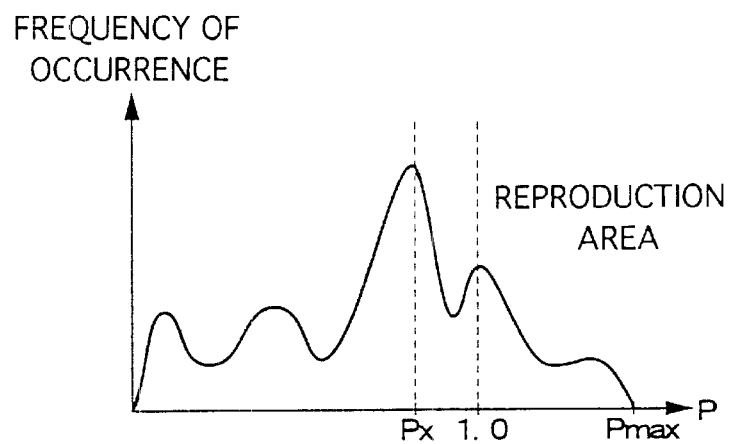
FIG. 3 illustrates an example of a standardized histogram.

FIG. 3 illustrates an example of the standardized saturation histogram. The standardized saturation P is plotted along the horizontal axis. The vertical axis indicates the frequency of appearance of the standardized saturation in one frame of an image.

Standardized saturation Pmax is the maximum value of standardized saturation P. The input saturation $C^*0$ at which the standardized saturation P becomes equal to or greater than 1.0 is a saturation that is not reproducible by the output unit. The standardized saturation (let this be represented by Px) for which the standardized saturation P is equal to or less than 1.0 and which has the highest frequency of occurrence is a compression threshold value, which will be described later.

The data representing the standardized saturation histogram generated by the standardized-saturation histogram generating circuit 15 is input to a smoothing circuit 17.

From the data representing hue θ0 input thereto, the comparator 14 extracts data indicative of the hue θ0 corresponding to the data (saturation data $C^*0$ not reproducible by the output unit) representing the saturation $C^*0$ having a standardized saturation P of greater than 1.0. The data representing the extracted hue θ0 is input to a hue histogram generating circuit 16 which generates a histogram of hue that is outside the area of color reproduction.

The hue histogram generating circuit 16 generates a histogram of hue outside the color reproduction area, the histogram representing the frequency of occurrence of hue θ0 corresponding to the data indicative of the saturation $C^*0$ at which the standardized saturation P becomes greater than 1.0.

Figure 5:
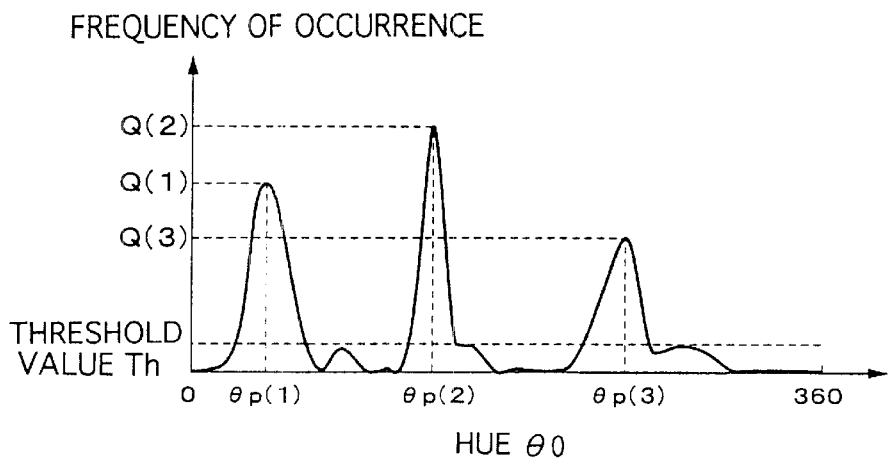
FIGS. 5 and 6 illustrate examples of histograms of hue outside a color reproduction area.

FIG. 5 illustrates an example of a histogram of hue outside the color reproduction area. The horizontal axis indicates the hue θ0 and the vertical axis indicates the frequency of appearance of the hue θ0 in one frame of an image.

The data representing the hue histogram generated by the hue histogram generating circuit 16 also is input to the smoothing circuit 17.

The smoothing circuit 17 smoothens the inputs thereof, namely the standardized saturation histogram and the histogram of hue outside the color reproduction area. The data representing the smoothened standardized saturation histogram and the data representing the smoothened histogram of hue outside the color reproduction area is input to a compression function generating circuit 18.

The compression function generating circuit 18 generates a compression function I(P,θ) for compressing the input saturation C* based upon the inputs thereof, namely the standardized saturation histogram and the histogram of hue outside the color reproduction area.

The compression function generating circuit 18 first generates a compressed saturation function F(P) and a compressed hue function H(θ) and then generates the compression function I(P,θ) based upon the compressed saturation function F(P) and compressed hue function H(θ).

Figure 4:
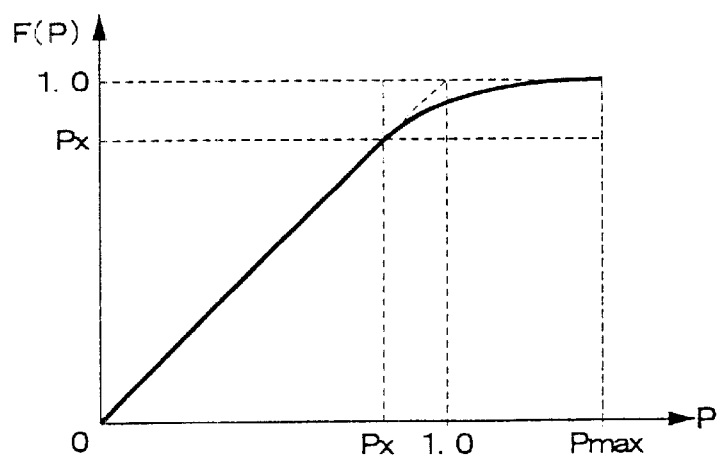
FIG. 4 illustrates an example of a compressed saturation function.

FIG. 4 illustrates an example of the compressed saturation function F(P), in which the standardized saturation P is plotted along the horizontal axis and the standardized saturation after compression is plotted along the vertical axis.

In the standardized saturation histogram (FIG. 3), the standardized saturation Px where the standardized saturation P is equal to or less than 1.0 and which indicates a peak value of frequency nearest 1.0 is adopted as the compression threshold value, as mentioned above. Compression is not applied with regard to the standardized saturation P less than the compression threshold value Px. The compressed saturation function F(P) is determined in such a manner that non-linear compression is applied in regard to the standardized saturation P equal to or greater than the compression threshold value Px but less than the maximum standardized saturation Pmax. The standardized saturation P equal to or greater than the compression threshold value-Px but less than the maximum standardized saturation Pmax is compressed so as to fit between the compression threshold value Px and 1.0. Thus the saturation $C^*0$ is compressed so as to become reproducible by the output unit, as will be described later.

Figure 7:
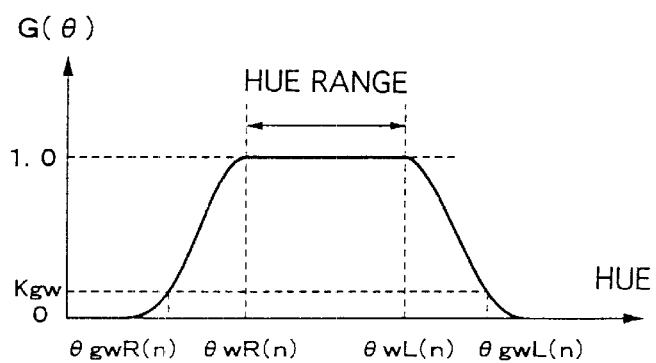
FIG. 7 illustrates an example of a compressed hue function.

FIG. 7 illustrates an example of a compressed hue function G(θ). The compression hue function G(θ) is generated in a manner described next.

As shown in FIG. 5, the number n of peaks equal to or greater than a predetermined threshold value Th is detected. In the case shown in FIG. 5, the number n of peaks equal to or greater than the predetermined threshold value Th is three. Frequency Q(n) regarding each peak is detected. Also detected is a hue θp(n) which gives each peak equal to or greater than the threshold value Th.

Figure 6:
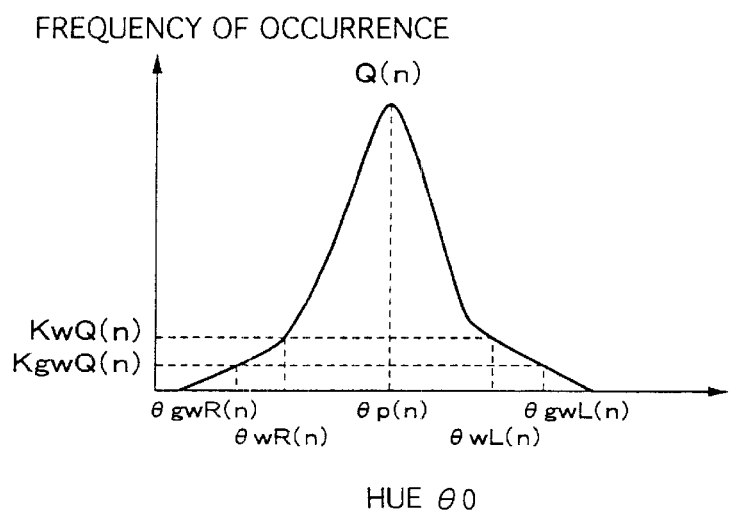

FIG. 6 is the result of extracting a histogram regarding a single peak value from the histogram shown in FIG. 5. Hue values θwL(n) [where θ>θp(n) holds] and θwR(n) [where θ<θp(n) holds] which take on a frequency obtained by multiplying the peak frequency Q(n) by a coefficient Kw (e.g., 0.7) are calculated for every obtained peak frequency Q(n). The compressed hue function G(θ) is assumed to be 1.0 between the calculated θwR(n) and θwL(n).

Next, a hue value which takes on a frequency obtained by multiplying the peak frequency Q(n) by a coefficient Kgw (e.g., $e^{-2}$) is calculated. This is followed by calculating θgwL(n) [where θ>θp(n) holds] and θgwR(n) [where θ<θp (n) holds].

In the case where θ<θwR(n) holds, the compressed hue function G(θ) is written as Equation (6) below, which is obtained from Equations (4) and (5).

$$\theta p(n-1) < \theta < \theta wR(n) \qquad \text{Equation (4)}$$

$$dr(n) = \theta wR(n) - \theta gwR(n) \qquad \text{Equation (5)}$$

$$G(\theta) = \text{Exp}\{-2\{[\theta - \theta wR(n)]/dr(n)\}^2\} \qquad \text{Equation (6)}$$

Similarly, a compressed hue function in the case where θ>θwL(n) holds is obtained.

The compressed hue function G(θ) is as indicated by the equations below.
When $$\theta p(n-1) < \theta < \theta wR(n) \qquad \text{Equation (7)}$$

holds, we have $$dr(n) = \theta wR(n) - \theta gwR(n) \qquad \text{Equation (8)}$$

which gives us $$G(\theta) = \text{Exp}\{-2\{[\theta - \theta wR(n)]/dr(n)\}^2\} \qquad \text{Equation (9)}$$

When $$\theta wR(n) < \theta < \theta wL(n) \quad \text{Equation (10)}$$

holds, we have $$Gn(\theta) = 1.0 \quad \text{Equation (11)}$$

When $$\theta wL(n) < \theta < \theta p(n+1) \quad \text{Equation (12)}$$

holds, we have $$dl(n) = \theta gwL(n) - \theta wL(n) \quad \text{Equation (13)}$$

which gives us $$G(\theta) = \text{Exp}\{-2\{[\theta - \theta wL(n)]/dl(n)\}^2\} \quad \text{Equation (14)}$$

The compressed hue function $H(\theta)$ regarding all peak frequencies of occurrence is expressed by Equation (15) below.

$$-H(\theta) = \Sigma Gn(\theta) \quad \text{Equation (15)}$$

Furthermore, in a case where $H(\theta) = 0$ holds in the compressed hue function $H(\theta)$, the compressed saturation function $F(P)$ is reproducible in the output unit and is defined as $FL(P)$ by Equations (16) and (17) below.

$$FL(P) = 1.0 \text{ (where } 1.0 < P \leq P\text{max)} \quad \text{Equation (16)}$$

$$FL(P) = P \text{ (where } 0 \leq P \leq 1.0) \quad \text{Equation (17)}$$

Finally, the compression function $I(P,\theta)$ is defined by Equation (18) below.

$$I(P,\theta) = [1 - H(\theta)] \times FL(P) + H(\theta)F(P) \quad \text{Equation (18)}$$

Figure 8:
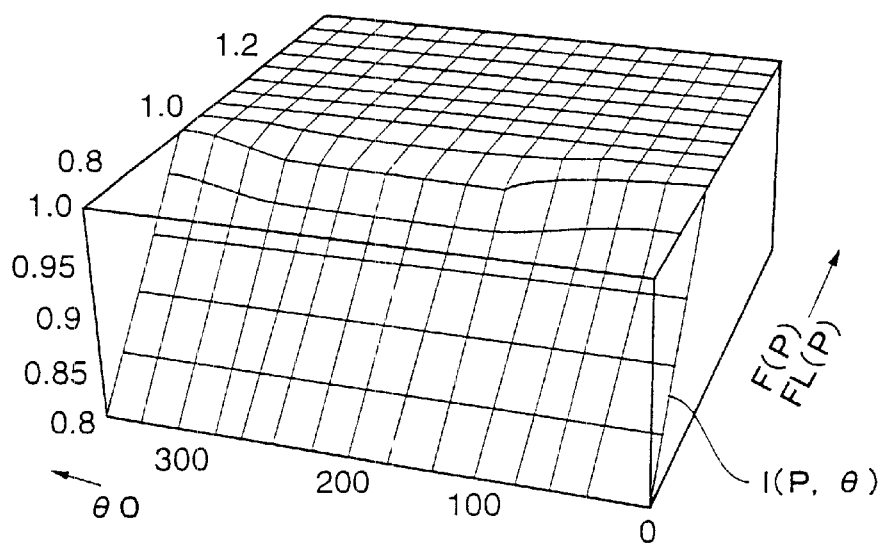
FIG. 8 illustrates an example of a compression function.
Figure 9:
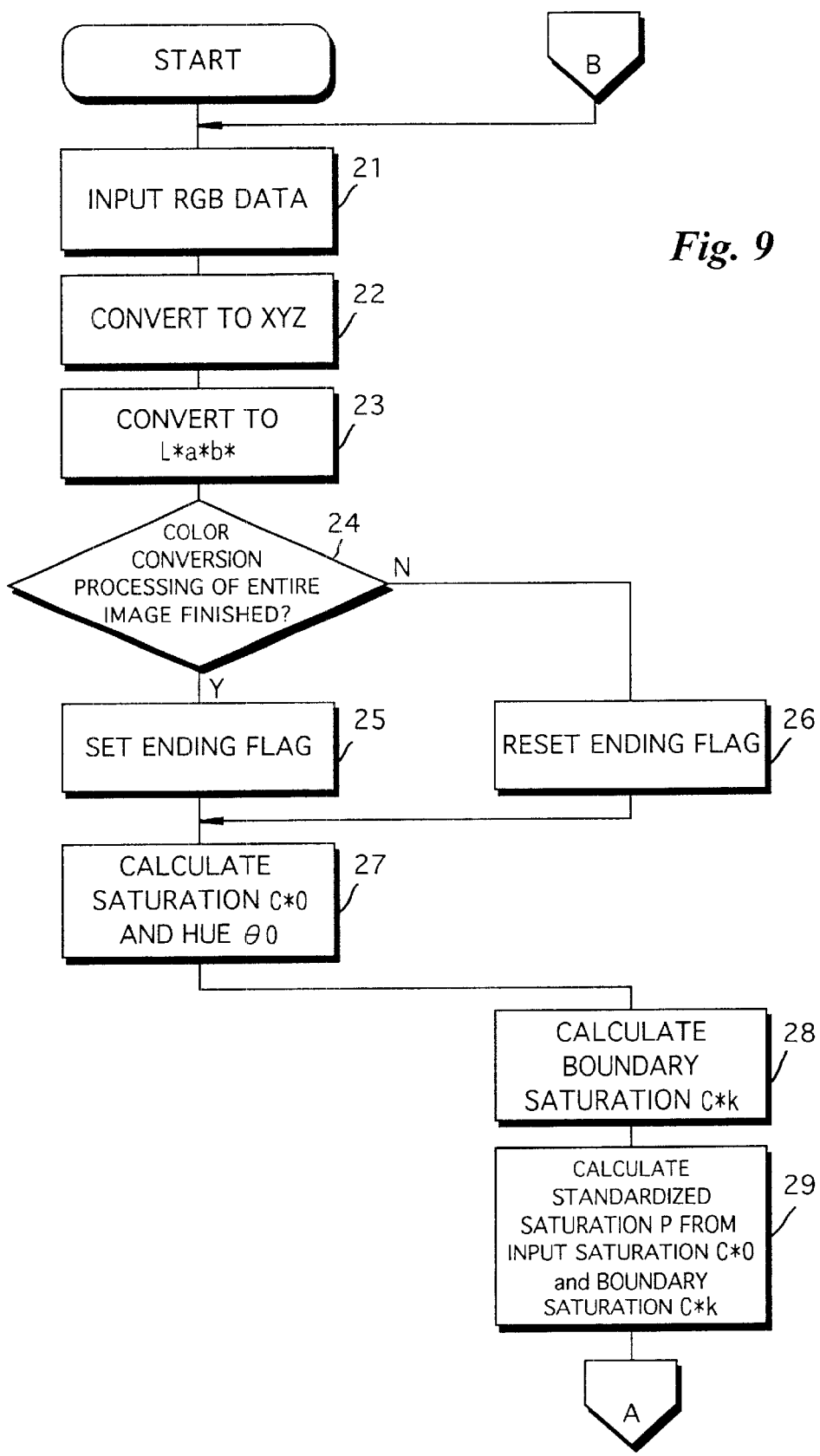
FIGS. 9 to 12 are flowcharts illustrating a processing procedure for color conversion.
Figure 10:
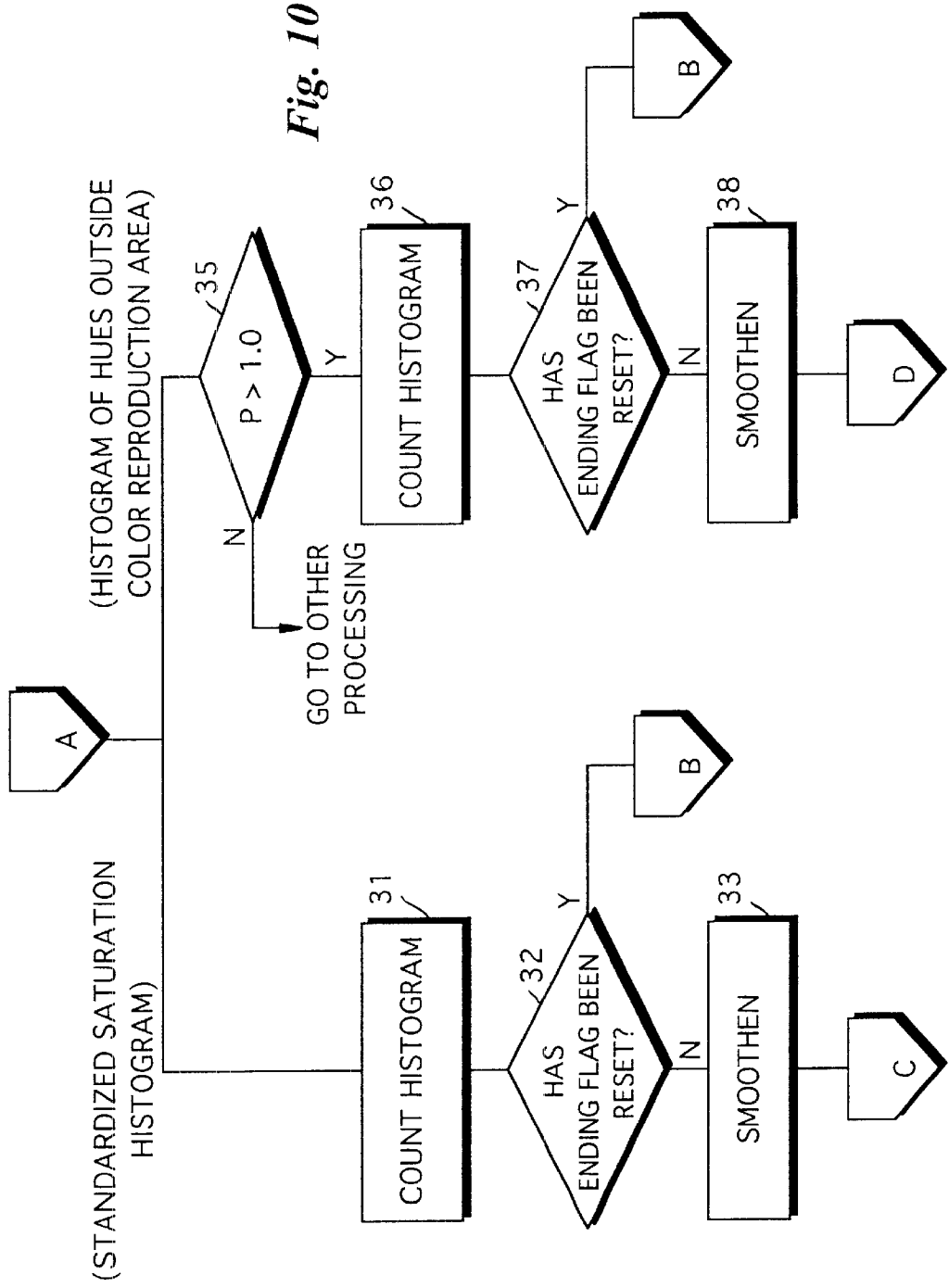
Figure 11:
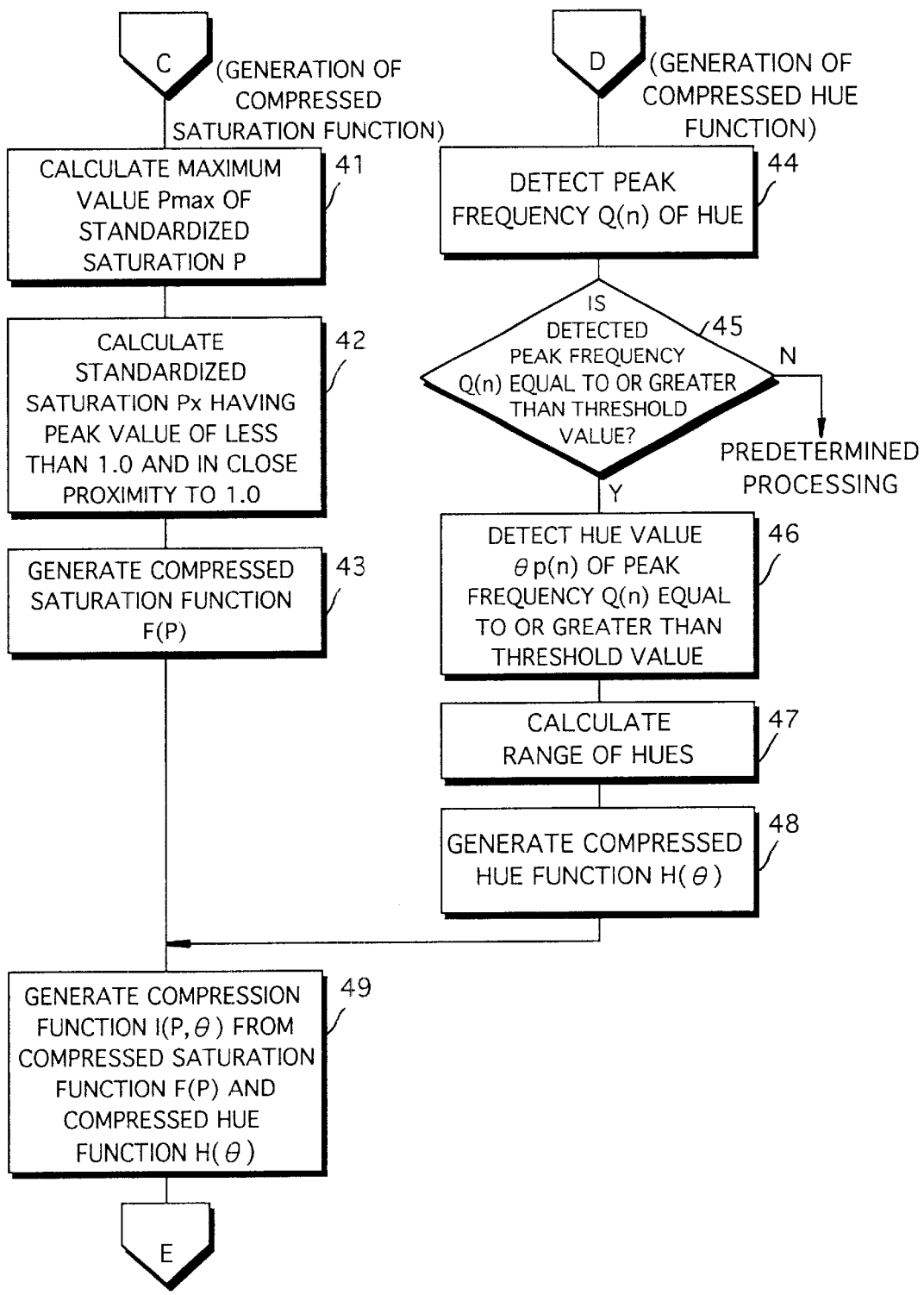
Figure 12:
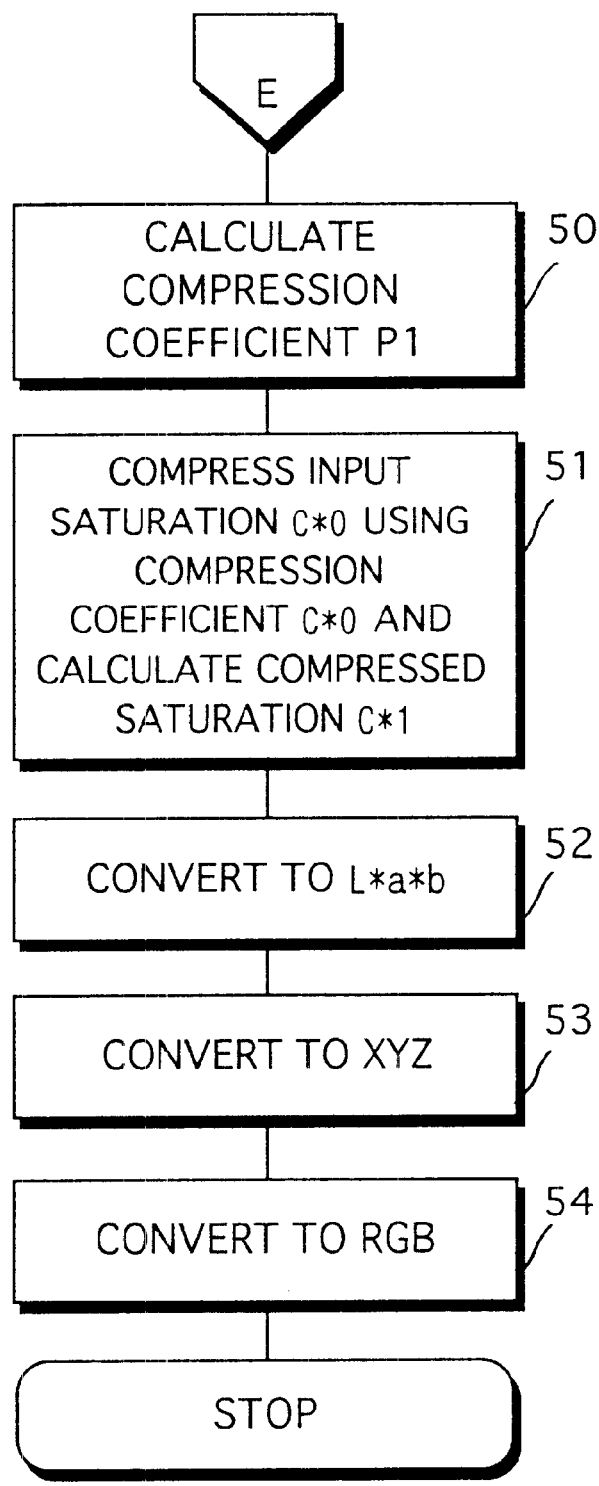

An example of the compression function $I(P,\theta)$ obtained is as shown in FIG. 8.

With reference again to FIG. 1, the compression function $I(P,\theta)$ generated by the compression function generating circuit 18 in the manner described above is input to a saturation compression circuit 7.

The data which is read out from the frame memory 5, representing the saturation C*0 and the data which is read out from the frame memory 6, representing the hue θ0 are also input to the saturation compression circuit 7.

The saturation compression circuit 7 multiplies the standardized saturation P by the compression function $I(P,\theta)$ to obtain a standardized saturation value P1 for compression. The compressed standardized saturation value P1 obtained is multiplied by the boundary saturation value C*k in accordance with Equation (19) below. As a result, a compressed saturation value C*1 that is reproducible in the output unit is obtained by the saturation compression circuit 7.

$$C^*1 = P1 \times C^*k \quad \text{Equation (19)}$$

The data representing the compressed saturation value C*1 is input to a L*a*b* conversion circuit 8. Also input to the L*a*b* conversion circuit 8 are the data representing the lightness L* read out of the frame memory 4 and the data representing the hue θ0 read out of the frame memory 6.

The L*a*b* conversion circuit 8 converts the input image data to image data in the L*a*b* colorimetric system. The image data in the L*a*b* calorimetric system is input to the XYZ conversion circuit 9. The latter converts the image data in the L*a*b* calorimetric system to data in the XYZ calorimetric system. The image data in the XYZ colorimetric system is input to an RGB conversion circuit 19, which converts the image data to RGB image data R1, G1, B1. This data is output to the output unit.

Thus, the reproducible image data R1, G1, B1 is input to the output unit.

Of the saturation data that has entered from the input unit, data representing saturation that is reproducible by the output unit is not subjected to compression. This means that saturation represented by the original saturation data is applied to the output unit. The saturation represented by the original input saturation data can be reproduced in the output unit. Only data representing saturation that is not reproducible by the output unit is compressed and is not subjected to unnecessary compression. This makes it possible to reproduce an image having a saturation close to the saturation represented by the original data.

As will be understood from FIG. 4, non-linear compression is applied to input saturation data whose value is equal to or greater than the compression threshold value. As a result, the saturation data can be subjected to compression processing while the original gradation characteristic is maintained.

In the embodiment described above, the compression threshold value Px is decided based upon saturation data having a high frequency of appearance in the saturation data that is reproducible in the output unit. As a consequence, saturation data having a high frequency of occurrence does not undergo compression. Data having a high frequency of occurrence represents a conspicuous portion in which the proportion of this data is high even in the original image. Since saturation data in an area in which the proportion of the data is high is not compressed, the saturation of a conspicuous portion is the same before and after color conversion.

In the embodiment described above, the arrangement is such that hue θ0 corresponding to entered saturation data is applied as an input, hue data corresponding to saturation data that cannot be reproduced by the output unit is detected based upon maximum saturation, and compression processing is applied to input saturation data that corresponds to the detected hue θ0.

Saturation data that is not reproducible in the output unit can be compressed. Since reproducible saturation data is not compressed, the original saturation can be maintained. An image having a color comparatively faithful to that of the original image can be output from the output unit.

FIGS. 9 to 12 are flowcharts illustrating the processing procedure in a case where the above-described color conversion is implemented using a computer.

Though the color conversion processing can be implemented using hardware, it can also be implemented by software using a computer. The processing procedure in such case will now be described in simple terms.

First, RGB image data is input to the computer from the input unit (step 21), then the input RGB image data is converted to image data in the XYZ colorimetric system (step 22). The image data in the XYZ colorimetric system is further converted to image data in the L*a*b* calorimetric system (step 23). It is then determined whether the color conversion processing of the entirety of one frame of an image has been completed (step 24). If the color conversion processing of the entirety of one frame of an image has been completed ("YES" at step 24), an ending flag is set (step 25). If the color conversion processing of the entirety of one frame of an image has not been completed ("NO" at step 24), then the ending flag is reset (step 26).

The saturation C*0 and hue θ0 are calculated from the perceived chromaticities a* and b* using Equations (1) and (2) (step 27).

The reproduction-boundary saturation C*k of the output unit is calculated as shown in FIG. 2b (step 28), and then the standardized saturation P is calculated from the input saturation C*0 and boundary saturation C*k using Equation (3) (step 29).

Next, control makes a transition to processing for generating the standardized saturation histogram and histogram of hue outside the area of color reproduction.

First, the standardized saturation P that has been calculated is counted successively to generate the standardized saturation histogram (step 31). Processing from step 21 onward is repeated until the ending flag is set (step 32). If the ending flag is set ("NO" at step 32), one frame of a standardized saturation histogram is generated. The standardized saturation histogram that has been generated is smoothened as by taking the running mean (step 33).

Next, the maximum value Pmax of the standardized saturation P is calculated (step 41). In the values of standardized saturation P of less than 1.0, standardized saturation Px having a peak value nearest to 1.0 is calculated (step 42). The calculated saturation Px becomes the compression threshold value. Thereafter, the compressed saturation function F(P) of the kind shown in FIG. 4 is generated (step 43).

The histogram of hue outside the area of color reproduction is generated next.

Counting processing is executed in regard to hue corresponding to data representing saturation for which the standardized saturation P is greater than 1.0 (steps 35, 36). Processing from step 21 onward is repeated until the ending flag is set (step 37). If the ending flag is set ("NO" at step 37), this means that the counting processing regarding one frame of image data is finished and the histogram of hue outside the color-reproduction area (FIG. 5) is obtained. The thus obtained histogram of hue outside the color-reproduction area is smoothened (step 38).

If the histogram of hue outside the color-reproduction area is generated, then the compressed hue function H(θ) is generated.

The peak frequency Q(n) of hue of the histogram of hue outside the color-reproduction area is detected (step 44). Next, whether the detected peak frequency Q(n) is equal to or greater than the threshold value is checked (step 45). Finally, the hue value θp(n) of the peak frequency Q(n) equal to or greater than the threshold value is detected (step 46).

If the hue value Op(n) of the peak frequency Q(n) is detected, a hue range [the range from QwR(n) to QwL(n)] of the kind shown in FIG. 7 is detected as was calculated with reference to Equations (4) to (6) (step 47).

The compressed hue function H(θ) indicated by Equation (15) is then generated as was calculated with reference to Equations (7) to (14) (step 48).

When the compressed saturation function F(P) and compressed hue function H(θ) are generated, the compression function I(P,θ) is generated in accordance with Equation (18) (step 49).

The compression coefficient P1 is calculated from the generated compression function I(P,θ) and standardized saturation P (step 50).

The input saturation value C*0 is compressed using the compression coefficient P1, thereby obtaining the compressed saturation C*1 (step 51). The compressed saturation C*1, the hue θ and the lightness L* undergo a L*a*b* conversion, whereby image data in the L*a*b* colorimetric system is obtained (step 52).

The image data in the L*a*b* calorimetric system is converted to image data in the XYZ colorimetric system (step 53). The image data in the XYZ calorimetric system is converted to RGB image data so that the data can be output by the output unit (step 54).

Thus, image data having a saturation capable of being reproduced by the output unit is obtained.

As many apparently widely different embodiments of the present invention can be made without departing from the spirit and scope thereof, it is to be understood that the invention is not limited to the specific embodiments thereof except as defined in the appended claims.

What is claimed is:

1. A color conversion apparatus comprising:
    a saturation data input unit for inputting saturation data;
    a compression threshold-value decision unit for deciding a compression threshold value regarding saturation based upon the saturation data that has been input from said saturation data input unit and data representing maximum saturation capable of being reproduced by an output unit; and
    a compression unit for compressing the input saturation data that is equal to or greater than the compression threshold value decided by said compression threshold-value decision unit so as to obtain saturation data representing a saturation reproducible by the output unit, and forgoing compression of the input saturation data that is less than the compression threshold value;
    wherein said compression threshold-value decision unit decides the compression threshold value based upon saturation data which has a high frequency of occurrence in one frame of the input saturation data and which is in close proximity to said reproducible saturation within the saturations reproducible by the output unit.

2. The apparatus according to claim 1, wherein said compression unit compresses the input saturation data equal to or greater than the compression threshold value non-linearly so as to obtain saturation data representing a saturation reproducible by the output unit.

3. The apparatus according to claim 1, further comprising:
    a hue data input unit for inputting hue data corresponding to saturation data that has been entered from said saturation data input unit;
    a hue data detection unit for detecting, on the basis of the maximum saturation, the hue data that corresponds to saturation data not reproducible by the output unit; and
    a compression control unit for controlling the compression unit so as to apply compression processing to the input saturation data that corresponds to the hue data detected by said hue data detection unit.

4. A color conversion method comprising the steps of:
    inputting saturation data;
    deciding a compression threshold value regarding saturation based upon the saturation data that has been input and data representing maximum saturation capable of being reproduced by an output unit; and
    compressing the input saturation data that is equal to or greater than the decided compression threshold value so as to obtain saturation data representing a saturation reproducible by the output unit, and forgoing compression of the input saturation data that is less than the compression threshold value;
    wherein deciding the compression threshold value is based upon saturation data which has a high frequency of occurrence in one frame of the input saturation data and which is in close proximity to said reproducible saturation within the saturations reproducible by the output unit.

5. A color conversion apparatus comprising:

a saturation data input unit for inputting saturation data;

a compression threshold-value decision unit for deciding a compression threshold value regarding saturation based upon the saturation data that has been input from said saturation data input unit and data representing maximum saturation capable of being reproduced by an output unit;

a compression unit for compressing the input saturation data that is equal to or greater than the compression threshold value decided by said compression threshold-value decision unit so as to obtain saturation data representing a saturation reproducible by the output unit, and forgoing compression of the input saturation data that is less than the compression threshold value;

a standardized saturation generating circuit which standardizes the inputted saturation data; and a standardized-saturation histogram generating circuit which calculates a ratio of standardized saturation with regard to all pixels and outputs a standardized saturation histogram.

* * * * *